(12) United States Patent
Jang et al.

(10) Patent No.: US 7,887,927 B2
(45) Date of Patent: Feb. 15, 2011

(54) HIGHLY CONDUCTIVE, MULTI-LAYER COMPOSITE PRECURSOR COMPOSITION TO FUEL CELL FLOW FIELD PLATE OR BIPOLAR PLATE

(75) Inventors: Bor Z. Jang, Centerville, OH (US); Aruna Zhamu, Centerville, OH (US); Jiusheng Guo, Centerville, OH (US)

(73) Assignee: Nanotek Instruments, Inc.

( * ) Notice: Subject to any disclaimer, the term of this patent is extended or adjusted under 35 U.S.C. 154(b) by 947 days.

(21) Appl. No.: 11/715,786

(22) Filed: Mar. 9, 2007

(65) Prior Publication Data
US 2008/0220282 A1 Sep. 11, 2008

(51) Int. Cl.
*B29B 7/00* (2006.01)

(52) U.S. Cl. ............... 428/542.8; 428/689; 428/697; 428/699; 429/34; 429/38; 429/39; 429/40

(58) Field of Classification Search ............ 429/34, 429/38, 39, 40; 428/689, 697, 699, 542.8
See application file for complete search history.

(56) References Cited

U.S. PATENT DOCUMENTS

| | | | |
|---|---|---|---|
| 5,300,370 A | 4/1994 | Washington et al. |
| 5,527,363 A | 6/1996 | Wilkinson et al. |
| 5,885,728 A | 3/1999 | Mercuri et al. |
| 5,942,347 A * | 8/1999 | Koncar et al. ............ 429/30 |
| 6,037,073 A | 3/2000 | Besmann et al. |
| 6,171,720 B1 | 1/2001 | Besmann et al. |
| 6,248,467 B1 | 6/2001 | Wilson et al. |
| 6,881,512 B2 | 4/2005 | Saito et al. |
| 6,939,638 B2 | 9/2005 | Saito et al. |
| 2004/0229993 A1 | 11/2004 | Huang et al. |

OTHER PUBLICATIONS

U.S. Appl. No. 11/293,540, filed Dec. 5, 2005, Jang.
U.S. Appl. No. 11/293,541, filed Dec. 5, 2005, Jang, et al.

* cited by examiner

*Primary Examiner*—Gwendolyn Blackwell

(57) ABSTRACT

This invention provides a moldable, multiple-layer composite composition, which is a precursor to an electrically conductive composite flow field plate or bipolar plate. In one preferred embodiment, the composition comprises a plurality of conductive sheets and a plurality of mixture layers of a curable resin and conductive fillers, wherein (A) each conductive sheet is attached to at least one resin-filler mixture layer; (B) at least one of the conductive sheets comprises flexible graphite; and (C) at least one resin-filler mixture layer comprises a thermosetting resin and conductive fillers with the fillers being present in a sufficient quantity to render the resulting flow field plate or bipolar plate electrically conductive with a conductivity no less than 100 S/cm and thickness-direction areal conductivity no less than 200 S/cm².

30 Claims, 9 Drawing Sheets (A)

(B)

(C)

(D)

HIGHLY CONDUCTIVE, MULTI-LAYER COMPOSITE PRECURSOR COMPOSITION TO FUEL CELL FLOW FIELD PLATE OR BIPOLAR PLATE

The present invention is based on the research results of a project supported by the US Department of Energy (DOE) SBIR-STTR Program. The US government has certain rights on this invention.

FIELD OF THE INVENTION

The present invention provides a method of producing a sheet molding compound (SMC) for use in a fuel cell bipolar plate or flow field plate. In particular, it relates to a roll-to-roll method of producing a flexible graphite-based, highly electrically conductive SMC and SMC-based flow field plates or bipolar plates for use in a proton exchange membrane fuel cell.

BACKGROUND OF THE INVENTION

A fuel cell converts chemical energy into electrical energy and some thermal energy by means of a chemical reaction between a fuel (e.g., hydrogen gas or a hydrogen-containing fluid) and an oxidant (e.g., oxygen). A proton exchange membrane (PEM) fuel cell uses hydrogen or hydrogen-rich reformed gases as the fuel, a direct-methanol fuel cell (DMFC) uses methanol-water solution as the fuel, and a direct ethanol fuel cell (DEFC) uses ethanol-water solution as the fuel, etc. These types of fuel cells that require utilization of a PEM layer as a proton transport electrolyte are collectively referred to as PEM-type fuel cells.

A PEM-type fuel cell is typically composed of a seven-layered structure, including (a) a central PEM electrolyte layer for proton transport; (b) two electro-catalyst layers on the two opposite primary surfaces of the electrolyte membrane; (c) two fuel or gas diffusion electrodes (GDEs, hereinafter also referred to as diffusers) or backing layers stacked on the corresponding electro-catalyst layers (each GDE comprising porous carbon paper or cloth through which reactants and reaction products diffuse in and out of the cell); and (d) two flow field plates (or a bi-polar plate) stacked on the GDEs. The flow field plates are typically made of graphite, metal, or conducting composite materials, which also serve as current collectors. Gas-guiding channels are defined on a GDE facing a flow field plate or, more typically, on a flow field plate surface facing a GDE. Reactants (e.g., $H_2$ or methanol solution) and reaction products (e.g., $CO_2$ at the anode of a DMFC, and water at the cathode side) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling channels and humidifying plates may be added to assist in the operation of a fuel cell stack.

In one common practice, a fuel flow field plate and an oxidant gas flow field plate are separately made and then assembled together to form a bipolar plate (one side of a bipolar plate serving as a negative terminal and the other side as a positive terminal, hence the name). In some cases, an additional separator is sandwiched between the two flow field plates to form a bipolar plate. It would be highly advantageous if the flow filed plates and the separator can be mass-produced into an integrated bipolar plate assembly. This could significantly reduce the overall fuel cell production costs and reduce contact ohmic losses across constituent plate interfaces. The bipolar plate is known to significantly impact the performance, durability, and cost of a fuel cell system. The bipolar plate, which is typically machined from graphite, is one of the most costly components in a PEM fuel cell.

Fluid flow field plates have open-faced channels formed in one or both opposing major surfaces for distributing reactants to the gas diffuser plates (the anode and cathode backing layers, typically made of carbon paper or fabric). The open-faced channels also provide passages for the removal of reaction products and depleted reactant streams. Optionally, a bipolar plate may have coolant channels to manage the fuel cell temperature. A bipolar plate should have the following desirable characteristics: high electrical conductivity (e.g., preferably having a conductivity no less than 100 S/cm), low permeability to fuel or oxidant fluids, good corrosion resistance, and good structural integrity.

Conventional methods of fabricating fluid flow field plates require the engraving or milling of flow channels into the surface of rigid plates formed of a metal, graphite, or carbon-resin composite. Such plates are expensive due to high machining costs. The machining of channels into the graphite plate surfaces causes significant tool wear and requires significant processing times. Metals can be readily shaped into very thin plates, but long-term corrosion is a major concern. A corrosion-resistant coating may be used, but it has to be applied perfectly. The coating may also increase contact resistance.

Alternatively, fluid flow field plates can be made by a lamination process (e.g., U.S. Pat. No. 5,300,370, issued Apr. 5, 1994), wherein an electrically conductive, fluid impermeable separator layer and an electrically conductive stencil layer are consolidated to form one open-faced channel. Presumably, two conductive stencil layers and one separator layer may be laminated to form a bipolar plate. It is often difficult and time-consuming to properly position and align the separator and stencil layers. Die-cutting of stencil layers require a minimum layer thickness, which limits the extent to which fuel cell stack thickness can be reduced. Such laminated fluid flow field assemblies tend to have higher manufacturing costs than integrated plates, due to the number of manufacturing steps associated with forming and consolidating the separate layers. They are also prone to delamination due to poor interfacial adhesion and vastly different coefficients of thermal expansion between a stencil layer (typically a metal) and a separator layer. Corrosion also presents a challenging issue for metal-based bipolar plates in a PEM fuel cell since they are used in an acidic environment.

A variety of composite bipolar plates have been developed, which are mostly made by compression molding of polymer matrices (thermoplastic or thermoset resins) filled with conductive particles such as graphite powders or fibers. Because most polymers have extremely low electronic conductivity, excessive conductive fillers have to be incorporated, resulting in an extremely high viscosity of the filled polymer melt or liquid resin and, hence, making it very difficult to process. Bi-polar plates for use in PEM fuel cells constructed of graphite powder/fiber filled resin composite materials and having gas flow channels are reviewed by Wilson, et al (U.S. Pat. No. 6,248,467, Jun. 19, 2001). Injection-molded composite-based bipolar plates are disclosed by Saito, et al. (U.S. Pat. No. 6,881,512, Apr. 19, 2005 and U.S. Pat. No. 6,939,638, Sep. 6, 2005). These thermoplastic or thermoset composites exhibit a bulk conductivity significantly lower than 100 S/cm (the US Department of Energy target value), typically not much higher than 10 S/cm.

Besmann, et al. disclosed a carbon/carbon composite-based bipolar plate (U.S. Pat. No. 6,171,720 (Jan. 9, 2001) and U.S. Pat. No. 6,037,073 (Mar. 14, 2000)). The manufacture process consists of multiple steps, including production of a carbon fiber/phenolic resin preform via slurry molding, followed by a compression-molding step. The molded part is then pyrolyzed at a high temperature (1,500° C.-2,500° C.) to obtain a highly porous carbon/carbon composite. This is followed by chemical vapor infiltration (CVI) of a carbon matrix into this porous structure. It is well-known that CVI is a very time-consuming and energy-intensive process and the resulting carbon/carbon composite, although exhibiting a high electrical conductivity, is very expensive.

Instead of using pyrolyzation and CVI to produce carbon/carbon composites, Huang, et al. (US Patent Application Pub. No. 2004/0229993, Nov. 18, 2004) discloses a process to produce a thermoplastic composite with a high graphite loading. First, polymer fibers, such as thermotropic liquid crystalline polymers or polyester, reinforcing fibers such as glass fibers, and graphite particles are combined with water to form a slurry. The slurry is pumped and deposited onto a sieve screen. The sieve screen serves the function of separating the water from the mixture of polymer fibers, glass fibers and graphite. The mixture forms a wet-lay sheet which is placed in an oven. Upon heating to a temperature sufficient to melt the polymer fibers, the wet-lay sheet is allowed to cool and have the polymer material solidify. Upon solidification, the wet-lay sheet takes the form of a sheet material with reinforcement glass fibers held together by globules of thermoplastic material, and graphite particles adhered to the sheet material by the thermoplastic material. Several of these sheets are then stacked, preferably with additional graphite powder interspersed between sheets, and compression-molded in a hot press. After application of heat and pressure in the press, one or more formed bipolar plates are obtained, where the bipolar plates are a composite of glass fibers, thermoplastic matrix and graphite particles. Clearly, this is also a tedious process which is not amenable to mass production.

Alternatively, fluid flow field plates can be made from an electrically conductive, substantially fluid impermeable material that is sufficiently compressible or moldable so as to permit embossing. Flexible graphite sheet is generally suitable for this purpose because it is relatively impervious to typical fuel cell reactants and coolants and thus is capable of isolating the fuel, oxidant, and coolant fluid streams from each other. It is also compressible and embossing processes may be used to form channels in one or both major surfaces. The "flexible graphite" is the exfoliated reaction product of rapidly heated natural graphite particles which have been treated with an agent that intercalates into the crystal structure of the graphite to expand the intercalated particles at least 80 or more times (up to 1000 times) in the direction perpendicular to the carbon layers in the crystal structure. The exfoliated graphite particles are vermiform in appearance, and are therefore commonly referred to as worms. The worms may be compressed together into flexible sheets which, unlike the original graphite flakes, can be formed and cut into various shapes. These thin sheets (foils or films) are hereinafter referred to as flexible graphite. Flexible graphite can be wound up on a drum to form a roll of thin film, just like a roll of thin plastic film or paper.

Although flexible graphite sheets are highly conductive, they by themselves do not have sufficient stiffness and must be supported by a core layer or impregnated with a resin. For example, U.S. Pat. No. 5,527,363 (Jun. 18, 1996) discloses a fluid flow field plate comprising a metal sheet interposed between two flexible graphite (FG) sheets having flow channels embossed on a major surface thereof. These FG-metal-FG laminates are also subject to the delamination or blistering problem, which could weaken the plate and may make it more fluid permeable. Delamination or blistering can also cause surface defects that may affect the flow channels on the plate. These problems may be difficult to detect during fabrication and may only emerge at a later date. The vastly different coefficients of thermal expansion (CTE) and elastic constants between a metal and a flexible graphite layer result in many challenging problems. In particular, thermal cycling between frozen and thawed states, as are likely to be encountered in an automobile application of the fuel cell, could result in delamination between a flexible graphite layer and the metal layer.

Alternatively, Mercuri, et al. (E.g., U.S. Pat. No. 5,885,728, Mar. 23, 1999) discloses a flexible graphite sheet having embedded ceramic fibers extending from its surface into the sheet to increase the resin permeability of the sheet for the preparation of a resin-impregnated flexible graphite bipolar plate. The step of adding ceramic fibers significantly increases the process complexity and cost. By allowing ceramic or glass fibers to puncture through layers of exfoliated graphite also leave these layers vulnerable to gas permeation, thereby significantly reducing the hydrogen and oxygen permeation resistance of a bipolar plate and increasing the chance of dangerous mixing of hydrogen and oxygen inside a fuel cell stack.

The flow field plate or bipolar plate should be constructed from inexpensive starting materials, materials that are easily formed into any plate configuration, preferably using a continuous molding process, and materials that are corrosion resistant in low temperature fuel cells and that do not require further processing such as high temperature pyrolyzation treatments. Any laminated or multi-layer plate should have adequate bonding between layers to ensure structural integrity and reduced contact resistance (reduced power loss due to joule heating).

Accordingly, an object of the present invention is to provide a multi-layer composite composition that can be easily molded or embossed into a flow field plate or bipolar plate. This precursor composition can be manufactured by using a fast and cost-effective roll-to-roll process. The process can be automated and adaptable for mass production. The resulting bipolar plate has the flexible graphite serving as the top and/or bottom sheets, which are bonded by an electrically conductive filler-resin mixture. There can be more than two flexible graphite sheets and more than one layer of conductive filler-resin mixture. The resulting fuel cell component is highly conductive and, hence, can be used as a flow field plate or bipolar plate in a fuel cell with reduced contact resistance.

It may be noted that a special case of the presently invented precursor composition has three layers: a top conductive sheet, a middle conductive filler-resin mixture layer, and a bottom conductive sheet with either or both conductive sheets being a flexible graphite sheet. This three-layer structure, after embossing or molding, becomes a flexible graphite-based sheet molding compound (FG-SMC), which is a subject of our two co-pending applications: (1) Bor Z. Jang, "Sheet Molding Compound Flow Field Plate, Bipolar Plate and Fuel Cell," U.S. patent Pending, Ser. No. 11/293,540 (Dec. 5, 2005) and (2) Bor Z. Jang, A. Zhamu, and Lulu Song, "Method for Producing Highly Conductive Sheet Molding Compound, Fuel cell Flow Field Plate, and Bipolar Plate," U.S. patent Pending, Ser. No. 11/293,541 (Dec. 5, 2005).

SUMMARY OF THE INVENTION

One embodiment of the prevent invention is a moldable, multi-layer precursor composition to an electrically conductive composite flow field plate or bipolar plate. The composition comprises at least a first conductive sheet, a second conductive sheet, and a first conductive filler-resin mixture layer disposed between the first conductive sheet and the second conductive sheet, wherein (a) at least one of the two conductive sheets (preferably both) is a flexible graphite sheet; and (b) the conductive filler in the mixture layer is present in a sufficient quantity to render the composition, after being molded into a plate, electrically conductive with a conductivity normal to the flexible graphite sheet (thickness-direction conductivity) no less than 10 S/cm or a conductivity parallel to the flexible graphite sheet (in-plane conductivity) no less than 100 S/cm. Further preferably, the thickness-direction conductivity is sufficiently high and the plate thickness is sufficiently low that the areal conductivity is no less than 200 S/cm$^2$.

It may be noted that the US Department of Energy (DOE) target for composite bipolar plates includes a bulk electrical conductivity of 100 S/cm or an areal conductivity of 200 S/cm$^2$, where the areal conductivity is essentially the ratio of the thickness-direction conductivity to the plate thickness. This implies that a thinner plate has a higher areal conductivity, given the same thickness-direction conductivity. One of the advantages of the presently invented precursor composition is the fact that this composition can be prepared in such a manner that the resulting composite plate can be as thin as 0.3 mm or thinner, in sharp contrast to the conventional graphite bipolar plates which typically have a thickness of 3-5 mm. This, when coupled with the fact that bipolar plates typically occupy nearly 90% of the total fuel cell stack thickness, implies that our technology enables the fuel cell stack size to be reduced dramatically. The resulting plates have electrical conductivities far exceeding the DOE target values, which was an original objective of the DOE-sponsored research and development work that resulted in the present invention.

In a preferred embodiment, a three-layer precursor composition may be match-molded or embossed to produce a sheet molding compound (SMC) composition, particularly for use as a fuel cell flow field plate or bipolar plate. The resulting SMC plate (after molding) comprises a top sheet, a bottom sheet, and a conductive filler-resin mixture sandwiched between the top sheet and the bottom sheet. At least one (preferably both) of the top sheet and bottom sheet comprises a flexible graphite sheet. The flexible graphite sheet has a planar outer surface having formed therein a fluid flow channel. The filler-resin mixture preferably comprises a thermoset resin that serves as a structural adhesive to bond the top and bottom layers together for forming a three-layer sandwich plate of good structural integrity. The conductive filler is present in a sufficient quantity to maintain continuous electron transport paths between the top layer and the bottom layer to render the resulting SMC electrically conductive enough to be a current collector material (a flow field plate or a bipolar plate).

This three-layer precursor composition and its resulting bipolar plate product may be prepared continuously, for instance, by a process comprising: (a) providing a continuous sheet of a substrate material (the bottom sheet), preferably from a roller or drum; (b) feeding a conductive filler-resin mixture to a surface of the substrate material sheet; (c) providing a continuous sheet of flexible graphite (the top sheet) onto the resin mixture in such a way that the filler-resin mixture forms a core layer sandwiched between the substrate material sheet and the flexible graphite sheet to obtain a laminated structure; and (d) compressing the laminated structure (for facilitating filler-resin mixing and contacting with the top and bottom layer) to obtain the precursor SMC composition which is collected on a winding device, such as a motorized roller. This is a roll-to-roll process that is amenable to mass production of the precursor SMC.

When both the top and bottom sheets are flexible graphite, bonded by an electrically conductive filler-resin mixture, the resulting three-layer plate can be used as a bipolar plate that is interposed between two fuel cell units. In this case, each flexible graphite sheet has a substantially planar outer surface having fluid flow channels molded therein. These flow channels are preferably created through embossing during or after the SMC precursor is made on a continuous basis.

If only one sheet (say, the top sheet) is flexible graphite and the bottom sheet is a sheet of non-sticking plastic film or paper (a protective layer), the flexible graphite sheet and the plastic film may be laminated initially into a three-layer structure. A mold release agent may be used between the plastic sheet and the filler-resin mixture layer to facilitate the separation of the plastic sheet from the resin mixture-bonded flexible graphite plate at a later time. Embossing or matched-mold pressing is carried out before, during, and/or after resin curing to produce flow channels on the outer surface of the flexible graphite sheet. The plastic sheet or film is then peeled off, leaving behind a two-layer plate that can be used as a flow field plate. Alternatively, the protective plastic film may be peeled off prior to molding.

Further alternatively, another preferred embodiment of the present invention is a two-layer precursor composition comprising a (first) flexible graphite (FG) layer overlaid with a conductive filler-resin mixture layer. This two-layer precursor composition may be prepared using a SMC process described above, but with one layer being a non-sticking, protective layer (plastic film or paper). By peeling off this protective layer one obtains a two-layer precursor structure that can serve as a building block for a multi-layer structure. For instance, by laying the filler-resin mixture layer of this two-layer structure over a second flexible graphite (FG) layer one obtains a three-layer precursor SMC composition: first FG-mixture-second FG. By overlaying the filler-resin mixture of another two-layer structure against a three-layer precursor SMC structure one obtains a five-layer precursor: FG-mixture-FG-mixture-FG. Similarly, one can lay another two-layer structure over a five-layer structure to obtain a seven-layer structure, etc.

An alternative way to prepare a multiple-layer precursor structure (e.g., five-layer precursor) is to feed a core FG layer with a top surface and a bottom surface from a feeder roller and spray a conductive filler-resin mixture to both the top surface and the bottom surface to obtain a mixture-FG-mixture structure. Two additional FG layers, fed from two separate rollers, are then overlaid to the two mixture layers coated on the core FG layer to form a five-layer precursor composition. To one of the exterior FG sheets may be sprayed a layer of conductive filler-resin mixture, which is in turn overlaid with another FG layer to obtain a seven-layer precursor composition.

In the aforementioned multi-layer precursor composition, the conductive filler comprises a conductive material selected from the group consisting of carbon fibers, metal fibers, carbon nano-tubes, graphitic nano-fibers, nano-scaled graphene plates, carbon blacks, metal particles, and combinations thereof. The conductive material being present in an amount of at least about 3% by weight (preferably at least 15% by weight and typically between 15% and 75% by weight), based on the total weight of the resin mixture. Preferably, the multi-layer composition as defined above has a filler-resin mixture having a thickness no greater than the thickness of a flexible graphite layer.

DETAILED DESCRIPTION OF THE INVENTION

Figure 1A:
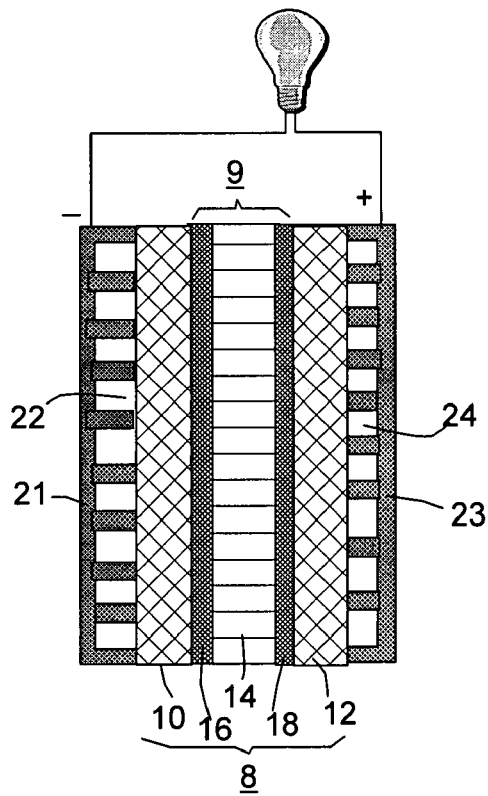
FIG. 1: (A) A sectional view of a prior art PEM fuel cell consisting of a membrane electrode assembly (MEA) sandwiched between two flow field plates 21, 23; and (B) A sectional view of a fuel cell stack consisting of two fuel cell units connected in series through a bipolar plate 19.

A prior art fuel cell, as shown in FIG. 1(A), typically comprises a membrane electrode assembly 8, which comprises a proton exchange membrane 14 (PEM), an anode backing layer 10 connected to one face of the PEM 14, and a cathode backing layer 12 connected to the opposite face of PEM 14. Anode backing layer 10 is also referred to as a fluid diffusion layer or diffuser, typically made of carbon paper or carbon cloth. A platinum/ruthenium electro-catalytic film 16 is positioned at the interface between the anode backing layer and PEM 14 for promoting oxidation of the methanol fuel. Similarly, at the cathode side, there are a backing layer or diffuser 12 (e.g., carbon paper or carbon cloth) and a platinum electro-catalytic film 18 positioned at the interface between the cathode backing layer and PEM 14 for promoting reduction of the oxidant.

In practice, the proton exchange membrane in a PEM-based fuel cell is typically coated on both sides with a catalyst (e.g., Pt/Ru or Pt) to form a catalyst-coated membrane 9 (CCM). The CCM layer 9 is then sandwiched between an anode backing layer 10 (diffuser) and a cathode backing layer 12 (diffuser). The resulting five-layer assembly is called a membrane electrode assembly 8 (MEA). Although some fuel cell workers sometimes refer to CCM as a MEA, we prefer to take the MEA to mean a five-layer configuration: anode backing layer, anode catalyst layer, PEM, cathode catalyst layer, and cathode backing layer.

The fuel cell also comprises a pair of fluid distribution plates (also referred to as fluid flow field plates) 21 and 23, which are positioned on opposite sides of membrane electrode assembly 8. Plate 21, which serves as a fuel distribution plate, is shaped to define fuel flow channels 22 facing towards anode diffuser 10. Channels 22 are designed to uniformly deliver the fuel to the diffuser, which transports the fuel to the anode catalyst layer 16. An input port and an output port (not shown), being in fluid communication with channels 22, may also be provided in flow field plate 21 so that carbon dioxide (in a DMFC) can be withdrawn from channels 22.

Figure 1B:
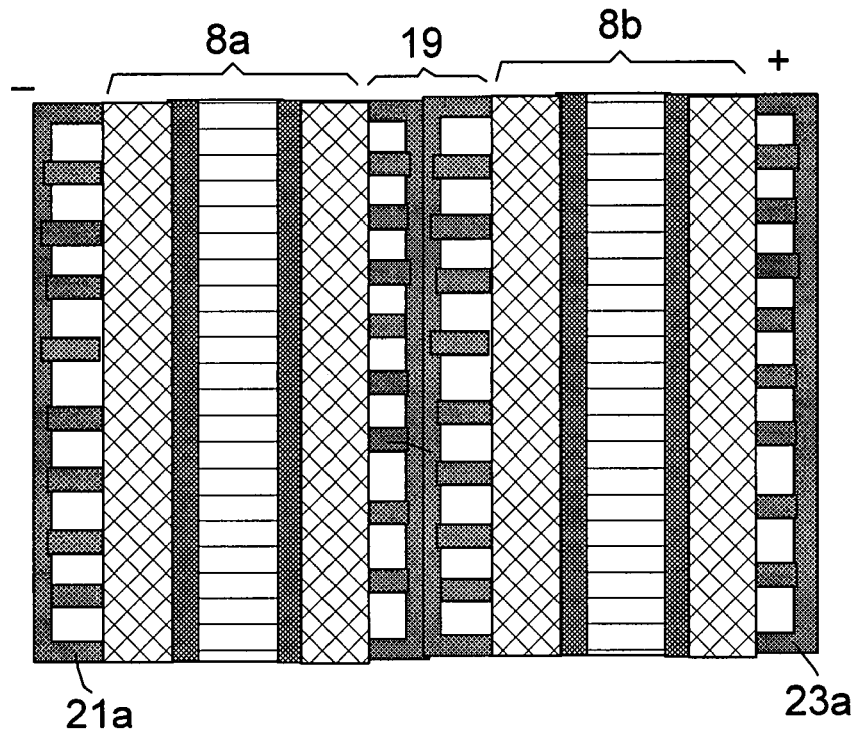

Flow field plate 23 is shaped to include fluid channels 24 for passage of a quantity of gaseous oxygen (or air). An input port and an output port (not shown) are provided in plate 23, which are in fluid communication with channels 24 so that oxygen (or air) can be transported through the input port to the cathode diffuser 12 and cathode catalyst layer 18, and water and excess oxygen (or air) can be withdrawn from channels 24 through the output port. Plate 23 is electrically conductive and in electrical contact with cathode diffuser 12. It can be used as a uni-polar plate (the positive terminal of the electrical current generated by the fuel cell unit) or as a part of a bi-polar plate (if integrated with fuel flow field plate 21). Shown in FIG. 1(B) is a fuel cell stack that consists of two fuel cell units. On the two opposite sides of the stack are two separate flow field plates 21a, 23a. Between the two MEAs (8a and 8b) is a bipolar plate 19, which can be viewed as two flow field plates integrated into one single component.

Figure 2:
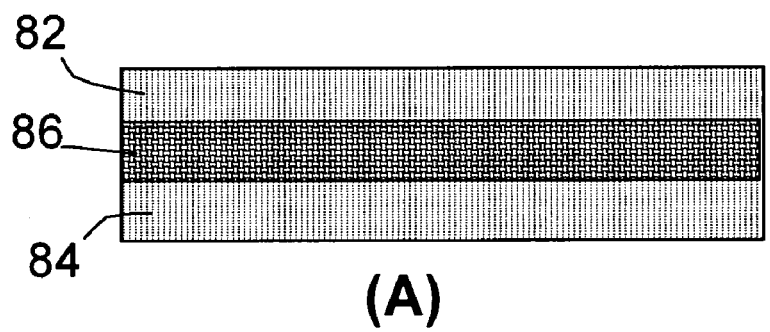
FIG. 2: (A) a three-layer precursor composition, (B) a two-layer precursor composition, (C) a five-layer precursor composition, and (D) a seven-layer precursor composition.
Figure 2:
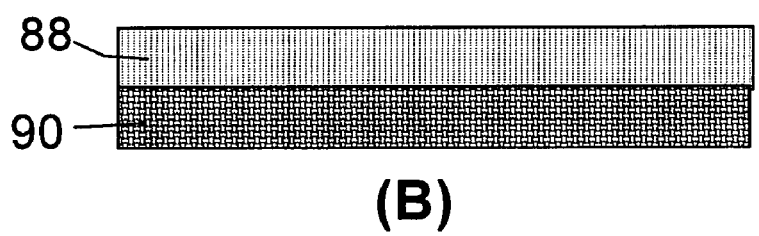
Figure 2:
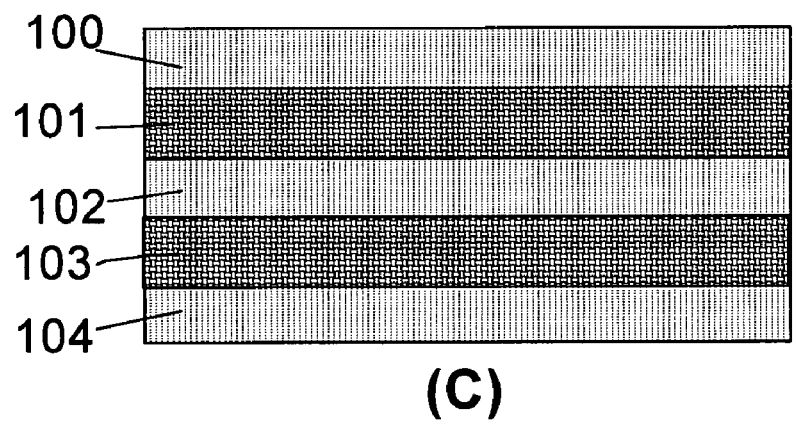
Figure 2:
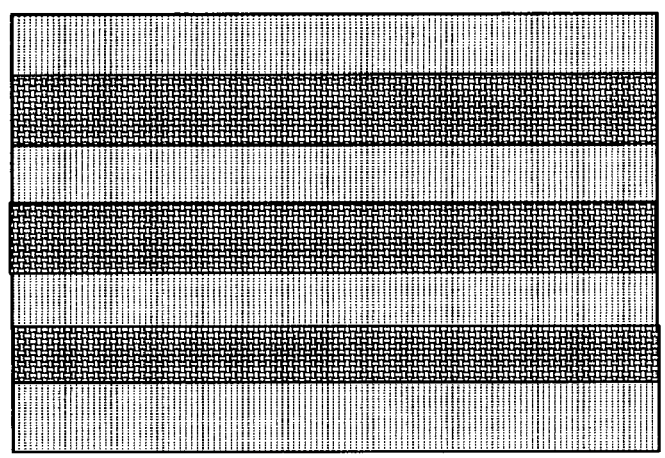

The present invention provides a multiple-layer precursor composition that can be easily molded into a flow field plate or bipolar plate. This composition may comprise any number of layers that lead to a desired thickness for a molded plate, but at least one layer is a flexible graphite (FG) layer. Preferably, at least the two opposing exterior surfaces of a three-layer, five-layer, or seven-layer precursor composition are both FG layers. Schematically shown in FIG. 2(A) is a three-layer precursor structure consisting of a core layer of a conductive filler-resin mixture 86 sandwiched between a first (top) conductive sheet 82 and a second (bottom) conductive sheet 84. Preferably, both conductive sheets are FG sheets. Before molding, the core layer is a mixture of a conductive filler such as finely divided graphite particles and a curable or solidifiable resin such as a thermosetting resin (that can be cured by heat or radiation), a thermoplastic resin (that can be melted and then solidified), a monomer or cyclic precursor (that can be polymerized).

Schematically shown in FIG. 2(B) is a two-layer precursor composition comprising a FG sheet 88 and a conductive filler-resin mixture layer 90. During the preparation and storage stage of such a two-layer precursor composition, a third layer (e.g., a non-sticking paper or plastic film) can be laid over the filler-resin mixture layer 90 to protect this mixture layer. This will enable the resulting three-layer structure to be wound up as a roll for easy storage and shipping. FIG. 2(C) schematically shows a five layer precursor composition that consists of three conductive sheets 100, 102, 104 and two conductive filler-resin mixture layers 101, 103. Each conductive sheet is overlaid with a mixture layer and bonded thereto. Each mixture layer is sandwiched between two conductive sheets. Again, at least one of the three conductive sheets 100, 102, 104 is a FG sheet and preferably all three conductive sheets are FG sheets. FIG. 2(D) schematically shows a seven-layer precursor composition consisting of four conductive sheets and three conductive filler-resin mixture layers. If necessary, additional layers can be added to this seven-layer structure. Essentially any number of layers is possible, but this number is determined by the required bipolar plate or flow field plate thickness. The multi-layer precursor composition, preferably prepared in a coiled roll form can be stored or shipped to an end user (e.g., molder of bipolar plates) who can conveniently cut and mold the precursor composition into plates without having to go through resin-filler formulating operations. The precursor composition is an intermediate product that is similar to the well-known resin-impregnated fiber sheets (prepregs) in composite industry.

Figure 3A:
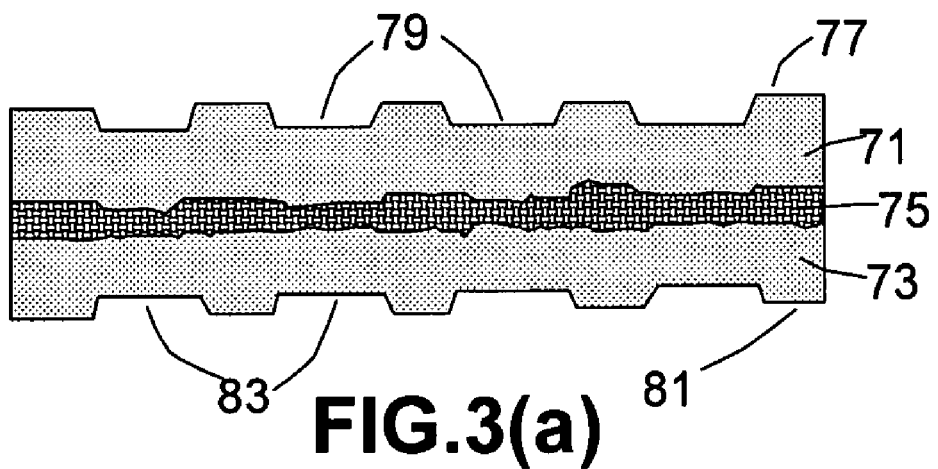
FIG. 3: A sectional view of (a) a bipolar plate consisting of a top flexible graphite layer, a bottom flexible graphite layer, and a core resin-mixture layer; (b) a flow field plate consisting of a top flexible graphite layer, a core resin mixture layer, and a plastic film as a tentative bottom layer; (c) a flow field plate with the plastic film peeled off; (d) a five-layer bipolar plate consisting of three conductive FG sheets 91, 94, 97 and two conductive filler-resin mixture layers 92, 95 that serve to bond the FG sheets together and having outer surfaces with flow channels 93, 99 molded or embossed thereon; (e) a seven-layer bipolar plate.
Figure 3B:
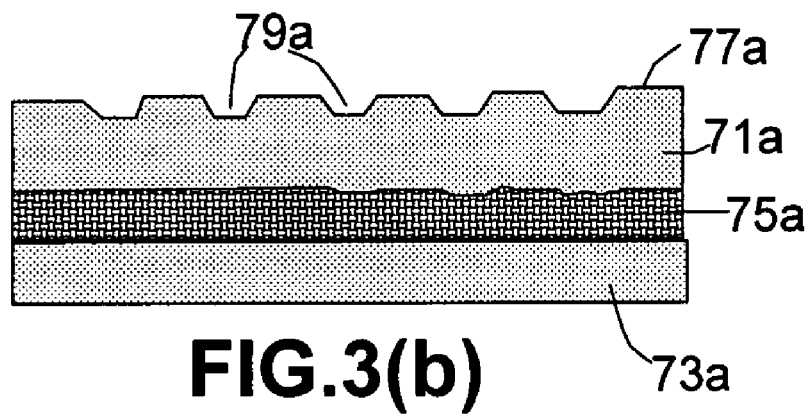
Figure 3C:
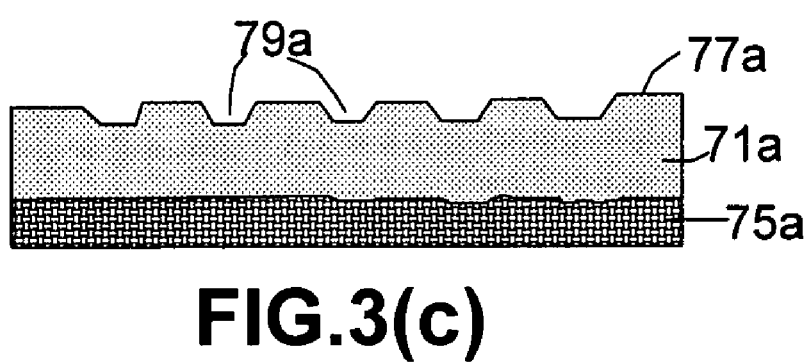
Figure 3D:
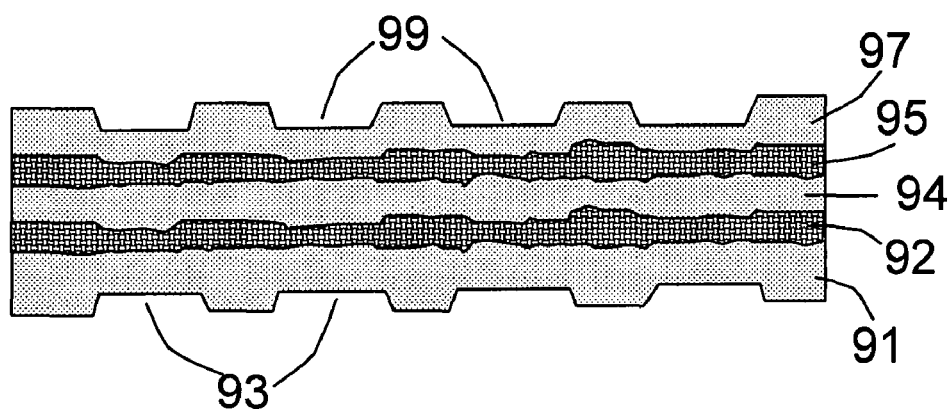
Figure 3E:
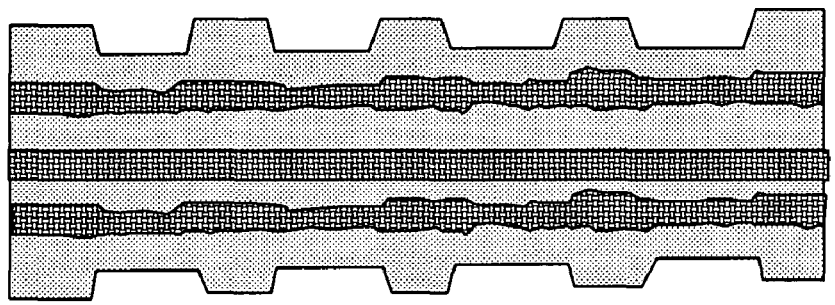

The precursor compositions depicted in FIGS. 2(A)-(D) can be molded into bipolar plates or flow field plates shown in FIGS. 3(a)-(e). Schematically shown in FIG. 3(a) is a molded bipolar plate composed of a conductive filler-resin mixture layer 75 (wherein the resin has been cured or solidified) sandwiched between two conductive sheets 71, 73. Flow field channels 79, 83 are created during molding or embossing. FIG. 3(b) schematically shows a molded flow field plate that comprises a flexible graphite layer 71a and a conductive filler-resin layer 75a. Flow field channels 79a are created on the FG layer surface. The third layer 73a can be another FG sheet. Alternatively, it can be just the protective layer which, when peeled off, becomes a two-layer flow field plate shown in FIG. 3(c). The five-layer bipolar plate shown in FIG. 3(d) consists of three conductive FG sheets 91, 94, 97 and two conductive filler-resin mixture layers 92, 95 that serve to bond the FG sheets together. The outer surfaces have flow channels 93, 99 molded or embossed thereon. A seven-layer bipolar plate is shown in FIG. 3(e).

In the manufacture of fiber reinforced resin composite products, conventional (prior art) sheet molding compounds (SMCs) are frequently used which consist of a mixture of a viscous uncured thermosetting resin and chopped fibers, such as glass fibers. In most cases the resin and chopped fibers are sandwiched between films of plastic material to form a laminated structure which is wound in a coiled form. The laminate is stored under conditions which will not result in final curing of the resin. At the time of use, the laminate is uncoiled and cut to the desired size and shape for the molding operation. As the resin employed to provide the sheet molding compound is relatively viscous, specific procedures must be employed to provide a thorough impregnation of fibers with the resin. Impregnation can be achieved by passing the laminated structure between cooperating rolls or flexing the laminate in concave and convex shapes. These prior art SMC composites do not have a sufficient electrical conductivity for flow field plate or bipolar plate applications.

The present invention provides a precursor composition and method of producing such a precursor composition which can be molded into a highly conductive SMC plate (three-layer) or other multi-layer plates for fuel cell applications. Using a three-layer composition as an example, the SMC composition, prior to shaping and curing into a flow field or bipolar plate, is a laminar structure comprising a top sheet, a bottom sheet and a core layer sandwiched between these two sheets. After molding, the SMC-based bipolar plate, schematically shown in FIG. 3(a), comprises a top sheet 71, a bottom sheet 73, and a filler-resin mixture 75 sandwiched between the top sheet and the bottom sheet. At least one of the top sheet and the bottom sheet comprises a flexible graphite sheet. The flexible graphite sheet (e.g., the top sheet 71) has a planar outer surface 77 having formed therein a fluid flow channel 79. The resin mixture 75 comprises a thermoset resin (with or without a catalyst) and a conductive filler present in a sufficient quantity to render the SMC composition electrically conductive enough to be a current collector material (with an in-plane conductivity of the subsequently molded SMC preferably no less than 100 S/cm). When the resin is cured or solidified, the two sheets 71,73 are well bonded by the resin to provide good structural integrity to the resulting "laminated" structure. The thermoset resin can be any resin which, upon exposure to heat or high energy radiation (e.g., electron beam), becomes cured (e.g., forming a cross-linked polymer chain network). The thermoset resin may be advantageously selected from the group consisting of unsaturated polyester resins, vinyl esters, epoxies, phenolic resins, polyimide resins, bismaleimide resins, polyurethane resins, and combinations thereof.

As an example only, a three-layer composition for use as a fuel cell flow field plate or bipolar plate material can be produced by a method comprising: (a) providing a continuous sheet of a substrate material (becoming the bottom sheet), preferably from a roller or drum; (b) feeding a resin mixture to a surface of the substrate material sheet with the conductive filler-resin mixture; (c) providing a continuous sheet of flexible graphite (becoming the top sheet) onto the filler-resin mixture in such way that the filler-resin mixture forms a core layer sandwiched between the substrate material sheet and the flexible graphite sheet to obtain a laminated structure; and (d) compressing the laminated structure (for facilitating filler-resin mixing) to obtain the SMC composition which is collected on a winding device, such as a motorized roller. This is a roll-to-roll process that is amenable to mass production of SMC. The process may be adapted to produce precursor compositions that comprise more than three layers of flexible graphite and/or filler-resin mixture.

The conductive filler in the resin mixture may be selected from small-sized particles (preferably smaller than 10 μm and more preferably smaller than 1 μm) such as a carbon black, graphite particle, nano-scaled graphene plate, graphitic nano-fiber, carbon nano-tube, metal particle, or a combination thereof. When a thicker filler-resin mixture layer is allowed or desired, carbon or graphite fibers (fiber diameter typically greater than 12 μm) may also be used, alone or in conjunction with the aforementioned small-sized particles. A second thermoset resin or a thermoplastic may be used to adjust the mixture viscosity and to assist in bonding the filler particles together. Although not necessarily preferred, a quantity of other types of reinforcement fibers, such as glass fiber or polymer fiber, may be added to impart additional structural integrity to the filler-resin mixture layer and that of the resulting multi-layer plate.

The type and proportion of the conductive filler are preferably chosen in such a way that the bulk (in plane) conductivity of the resulting resin mixture is greater than 100 S/cm, further preferably greater than 200 S/cm, and most preferably greater than 300 S/cm. Typically, when the conductive filler proportion in the resin mixture is between 15% and 75% by weight (based on the total weight of the filler-resin mixture), the bulk conductivity of the resin mixture exceeds 100 S/cm and, in many cases, even greater than 400 S/cm, far exceeding the US Department of Energy conductivity target (100 S/cm) for composite bipolar plates. Typically, the thickness-direction conductivity is much greater than 10 S/cm, resulting in an areal conductivity of a 0.5 mm thick plate much higher than 200 S/cm$^2$, another acceptable DOE target conductivity value for a composite bipolar plate.

In one preferred embodiment (FIG. 3(a)), when both the top and bottom sheets are flexible graphite and are bonded by an electrically conductive resin mixture, the resulting three-layer plate can be used as a bipolar plate that is interposed between two fuel cell units. In this case, each flexible graphite sheet has a substantially planar outer surface (e.g., surface 77 on the top sheet 71 and surface 81 on the bottom sheet 73) having fluid flow channels (e.g., channel 79 on the top sheet and 83 on the bottom sheet) molded therein. These flow channels are preferably created through embossing during or after the SMC plate is made on a continuous basis.

If only one sheet (say, the top sheet 71a of FIG. 3(b)) is flexible graphite and the bottom sheet is a sheet of plastic material (plastic film 73a), the flexible graphite sheet and the plastic sheet may be laminated initially into a three-layer SMC structure (FIG. 3(b)). A mold release agent may be used between the plastic sheet and the resin mixture layer to facilitate later separation of the plastic sheet from the resin mixture-bonded flexible graphite plate. Embossing or matched-mold pressing is carried out before, during, and/or after resin curing to produce flow channels 79a on the outer surface 77a of the flexible graphite sheet 71a. The plastic sheet or film 73a is then peeled off, leaving behind a two-layer plate (FIG. 3(c)) that can be used as a flow field plate.

In one embodiment of the present invention, the top sheet is a flexible graphite foil, but the bottom sheet can be an electrically conductive film or foil, such as a carbon paper, carbon or graphite fabric, conductive polymer film, or metal foil. This will also make a good bipolar plate. In another preferred embodiment, either or both of the top and bottom sheets of a five- or seven-layer composition is a FG layer and other conductive sheet(s) can be selected from a carbon paper, carbon/graphite fabric, carbon/graphite fiber-containing mat, conductive polymer film, thin metal foil and/or flexible graphite.

The overall conductivity of a two-layer flow field plate or a three-layer bipolar plate also depends upon the relative thickness of the resin matrix layer (or core layer) with respect to the total thickness of the flexible graphite sheets. Since the flexible graphite is highly conductive (typically with a conductivity much greater than 1,000 S/cm, but can be as high as 20,000 S/cm) and the filler-resin matrix layer is typically lower than flexible graphite in conductivity, the resin matrix layer should be made as thin as possible to achieve a maximum electronic conductivity. With both of the top and bottom layers being each from 0.125 mm (125 µm) to 0.3 mm (300 µm) thick, the resin mixture layer is typically thinner than 100 µm, often thinner than 40 µm. However, a certain minimum core layer thickness may be required to obtain a desired level of mechanical stiffness or strength of the bipolar plate.

As indicated earlier, the conducting filler material may be selected from carbon fibers, metal fibers, metal particles (preferably nano-scaled), carbon nano-tubes (CNTs), graphitic nano-fibers (GNFs), nano-scaled graphene plates, carbon blacks, or a combination thereof. Individual nano-scaled graphite planes (individual graphene sheets) and stacks of multiple nano-scaled graphene sheets are collectively called nano-sized graphene plates (NGPs). The structures of these materials may be best visualized by making a longitudinal scission on the single-wall or multi-wall of a nano-tube along its tube axis direction and then flattening up the resulting sheet or plate. These nano materials have strength, stiffness, and electrical conductivity that are comparable to those of carbon nano-tubes, but NGPs can be mass-produced at lower costs. They can be produced by reducing the expanded graphite particles to much smaller sizes (100 nanometers or smaller). The preparation of other nano-scaled carbon-based materials, including CNTs, GNFs, and carbon black, is well-known in the art. They are all commercially available, along with nano-scaled metal particles. These nano-scaled, electrically conductive filler materials are preferred conductive filler ingredients for use in making the presently invented multi-layer precursor composition. It may be further noted that CNTs, GNFs, and NGPs are known to be capable of imparting high strength and stiffness to a resin matrix. They are ideally suited for the present applications.

Figure 4A:
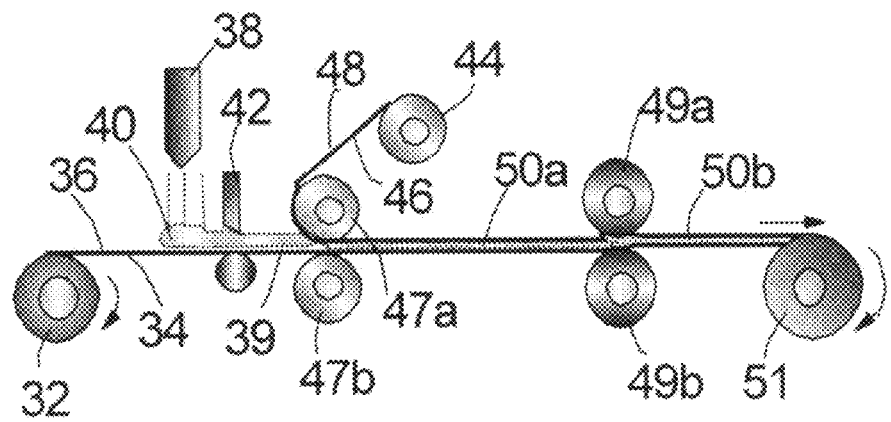
FIG. 4: (a) Schematic of a roll-to-roll process for preparing a highly conductive three-layer composition or sheet molding compound (SMC), as an example; (b) schematic of a process for fabricating SMC-based flow field plates or bipolar plates with the surface flow channels being generated via in-line embossing or matched-die molding; (c) Schematic of another embodiment of the presently invented roll-to-roll process for preparing a highly conductive precursor composition; and (d) schematic of a continuous process for fabricating SMC-based flow field plates or bipolar plates with the surface flow channels being generated via in-line embossing or matched-die molding.

Referring to FIG. 4(a) as an example, the preparation of a flexible graphite multi-layer composition (e.g., three-layer SMC composition) may begin with continuously or intermittently feeding (uncoiling) a thin flexible graphite sheet 34 (a bottom sheet in the present context) from a winding drum 32. The surface of the flexible graphite sheet 34 may be coated (or pre-coated) with a desired layer 36 of an uncured thermoset resin via a number of prior art coating techniques (e.g., spraying, printing, spin-coating, or, simply, brushing). A powder dispenser 38 is then operated to deposit a desired amount of a conductive filler 40 (or conductive filler plus some resin) onto the top surface of the thermoset resin layer 36 while the flexible graphite sheet is being driven forward to the right. It may be noted that the conductive filler is typically a mixture of conductive particles and fibers (non-conductive or, preferably, conductive fibers). A leveling device 42 (e.g., a scraping blade) is used to form a uniform-thickness layer 39 of a resin-filler premix. Concurrently, another flexible graphite sheet 46 (a top sheet), also coated or pre-coated with a thermoset resin layer 48 (with same or different composition), is similarly fed from a drum 44 in such a way that the resin layer 48 comes in contact with the premix 39 to form a three-layer pre-SMC composition. This laminated pre-SMC composition is then fed through the gap between a pair of rollers 47a, 47b to compress the composition 50a. A series of rollers (e.g., between 47a, 47b and 49a, 49b) are used to assist in mixing of the resin with the conductive filler. Specifically, impregnation or mixing of the filler particles/fibers with the resin can be achieved by passing the laminated structure 50a between cooperating rolls or flexing the laminate in concave and convex shapes to obtain a well-mixed three-layer precursor SMC composition 50b, which can be wound up on a roller 51. The precursor SMC composition may be stored under conditions which will not result in final curing of the resin. A catalyst inhibitor may be used to extend the shelf or storage life of the precursor SMC composition without premature curing. When a flow field plate or bipolar plate is needed, the SMC is uncoiled and cut to the desired size and shape for the molding operation. Compression molding, hot pressing, or matched-die molding may be used to create flow channels on the outer surfaces of the plate while the thermoset resin is being cured and hardened.

Figure 4B:
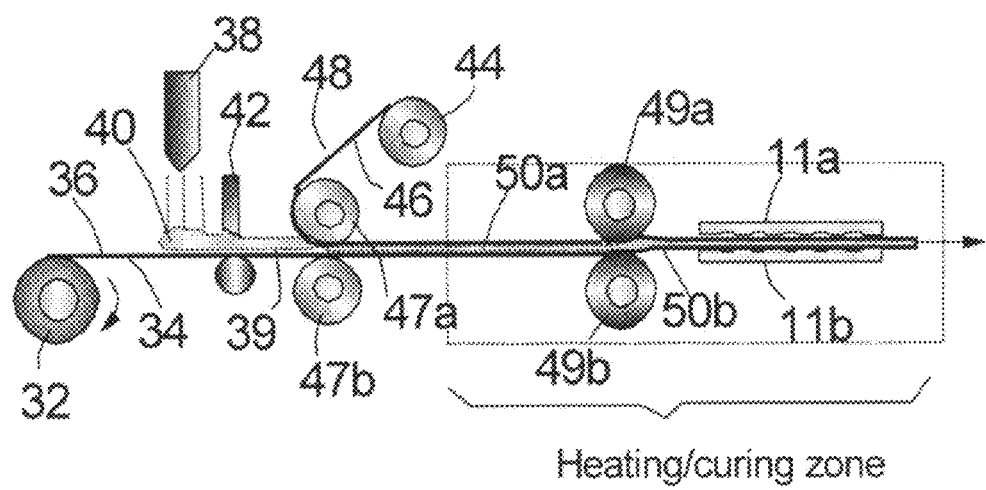

Alternatively or preferably, as schematically shown in FIG. 4(b), a continuous sheet of three-layer precursor SMC is fabricated in a procedure similar to that in FIG. 4(a). Heating means may be used to advance the cure reaction of the thermoset resin (e.g., in a heating zone indicated by a phantom box of FIG. 4(b)) to achieve a desired degree of curing before the composition is embossed or match-molded between a pair of embossing tools 11a,11b or matting mold platens to create the desired flow field channels. These tools or mold platens may also be heated. As the laminated sheet (50a or 50b)

continues to move forward, another portion of the sheet is embossed or molded. This is a continuous process that is suitable for cost-effective mass production of flow field plates or bipolar plates that are highly conductive.

Figure 5A:
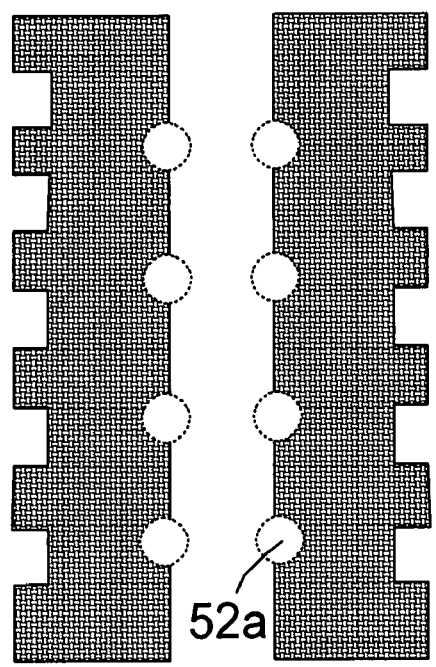
FIG. 5: (a) Schematic of two matting flow field plates each with half of the coolant channels; (b) the two plates, after being molded with the thermoset resin cured, are combined to form a bi-polar plate with coolant channels.
Figure 5B:
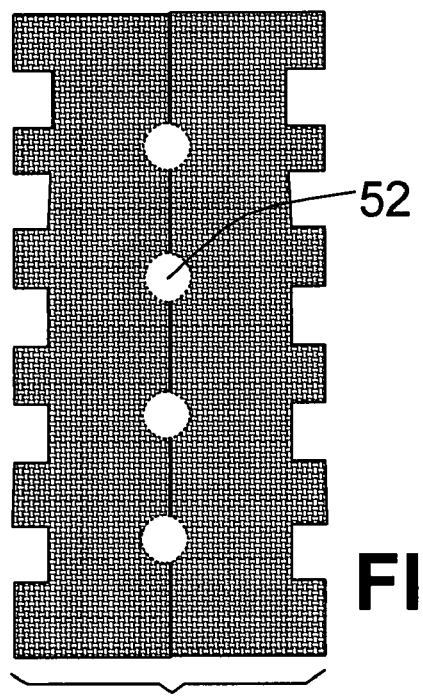

If one of the flexible sheets (either 34 or 46) is a plastic film, this film may be peeled off after resin is cured to obtain a flow field plate (e.g., FIG. 3(c). If coolant channels are needed, they can be created during the molding process in several ways. For instance, during the flow field plate molding process, the mold surface may be shaped to produce a part of a channel groove (e.g., 52a in FIG. 5(a)). Two matting flow field plates may then be positioned together to form a bipolar plate 54 (FIG. 5(b)) having complete coolant channels (e.g., 52).

In the presently invented composition, the ingredients may be artificially divided into two categories: (a) nano-scale fillers (e.g., CNTs, GNFs and NGPs for both structural reinforcement and conductivity enhancement of the thermoset resin, and nano-scale metal particles, carbon black powder, and nano-scaled graphite particles mainly for conductivity enhancement) and (b) micron-diameter or larger fillers (chopped glass fibers for structural reinforcement, micron or larger graphite particles for conductivity enhancement, and short carbon/graphite fibers for both structural reinforcement and conductivity enhancement). There are two basic input forms of micron-diameter fibers for being incorporated into the conductive filler-resin mixture: a multi-end roving (strands of continuous fibers), and pre-cut short fibers (typically micron to mm in length).

There are three basic routes of combining the ingredients of a resin mixture together:

(1) As illustrated in FIGS. 4(a) and 4(b), the thermoset resin and the filler may be supplied in three separate components and then combined and mixed.

(2) Mixing all of the filler ingredients with a thermoset resin to form a resin-filler mixture (e.g., in a static mixer), which is then made into a thin sheet. This thin sheet of resin mixture is then transferred to be sandwiched between a top sheet and a bottom sheet of a selected flexible material to form a laminar precursor structure such as a SMC.

Figure 4C:
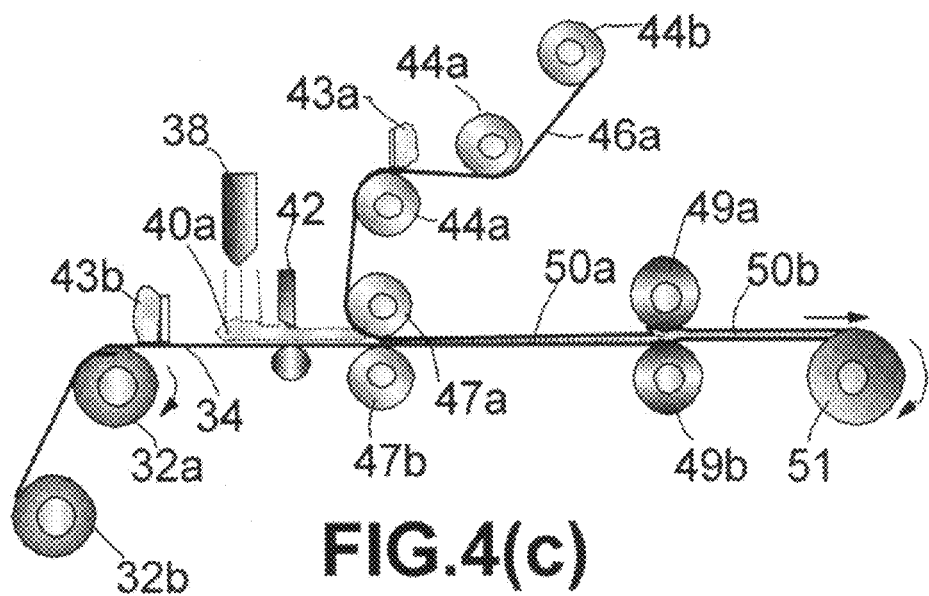
Figure 4D:
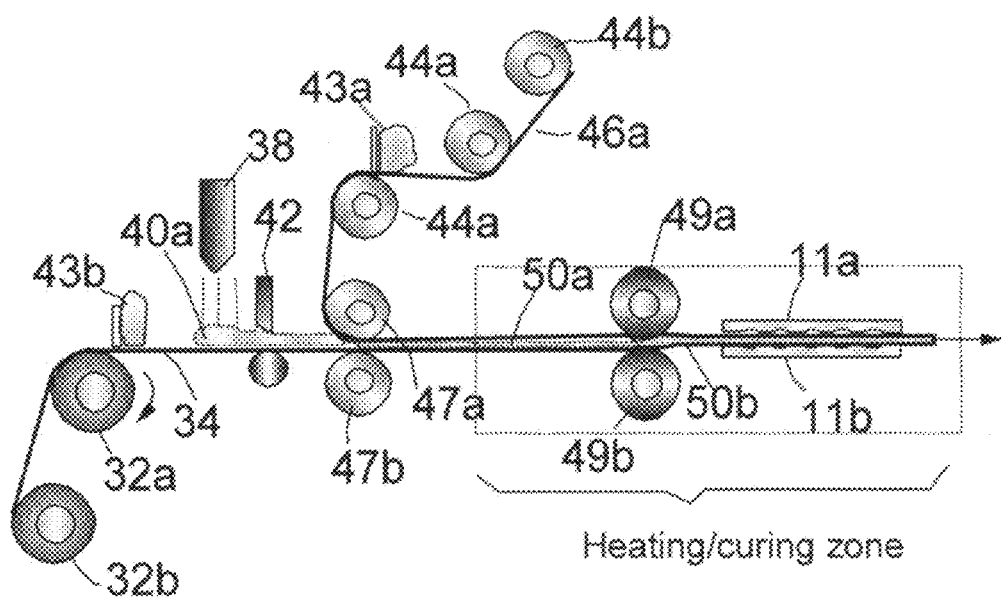

(3) Mixing most (if not all) of the nano-scale filler ingredients (including necessary catalyst, inhibitor, and viscosity adjusters, etc.) to form a resin mixture paste, which is then delivered by the bottom sheet and the top sheet to mix with other remaining ingredients (e.g., chopped fibers) of the conductive filler to form a core layer between the top sheet and bottom sheet, as illustrated in FIG. 4(c) and FIG. 4(d).

In the latter case (FIG. 4(c)), the process consists of chopping fibers 40a onto a sheet of substrate material 34 (flexible graphite, carbon paper, thin metal foil, carbon fiber mat, or plastic film like polyethylene, etc.) on which a resin-filler paste 43b has been doctored. A predetermined amount of this mixture paste 43a, placed on top of another film 46a (flexible graphite), is then conveyed forward to receive the dropping chopped fibers. The "sandwich" of resin mixture and chopped fibers is passed between compaction rolls 47a, 47b to wet the fibers and thoroughly mix the ingredients. Optionally, the mixture is then cured slightly (called aging, maturing, or B-staging) to produce a composition 50b with the filler-resin mixture having a leather-like texture and rolled-up for storage or shipment. The bottom sheet may come from the source roller 32b over a guiding roller 32a and, similarly, the top sheet may come from a source roller 44b over a guiding roller 44a. It may be noted that this process can be adapted to produce a precursor composition that comprises more than three layers by adding additional flexible graphite-feeding stations and additional filler-resin mixture feeding stations.

Again, a FG-based multi-layer flow field plate or bipolar plate can be produced directly in line, as schematically shown in FIG. 4(d). A continuous multi-layer composition is fabricated in a procedure similar to that in FIG. 4(c). Heating means may be used to advance the cure reaction of the thermoset resin (e.g., in a heating zone indicated by a phantom box of FIG. 4(d)) to achieve a desired degree of curing before the precursor composition is embossed or matched-die molded between a pair of embossing tools 11a,11b or matting mold platens to create the desired flow field channels. These tools or mold platens may also be heated. As the laminated sheet (50a or 50b) continues to move forward, another portion of the sheet is embossed or molded. This is a continuous process that is suitable for cost-effective mass production of flow field plates or bipolar plates that are highly conductive.

Figure 6A:
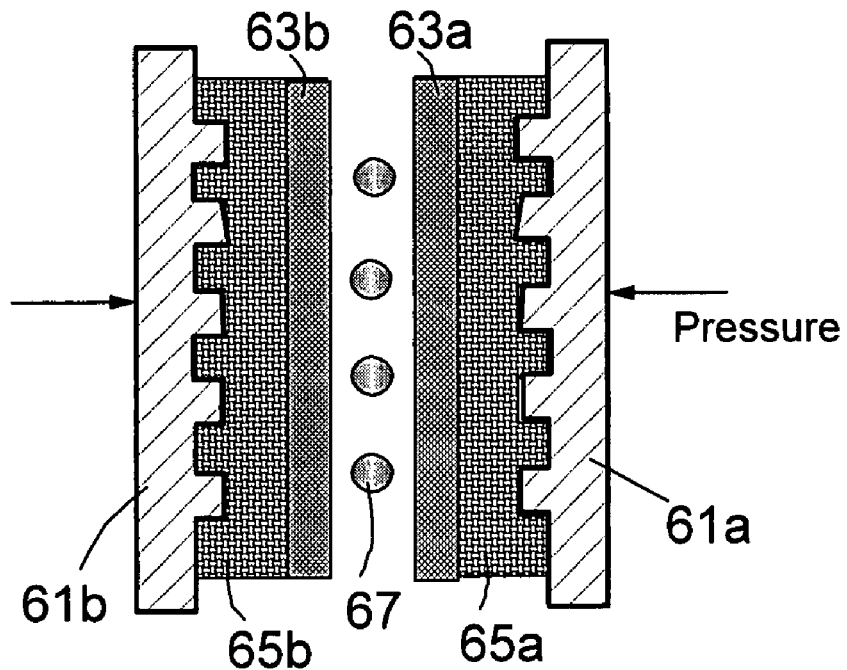
FIG. 6: (a) Schematic of two matting SMC laminates (prior to being fully cured) being molded in a matched-mold pressing process with molding pins being inserted to produce coolant channels; (b) the resulting integral bipolar plate with built-in coolant channels.
Figure 6B:
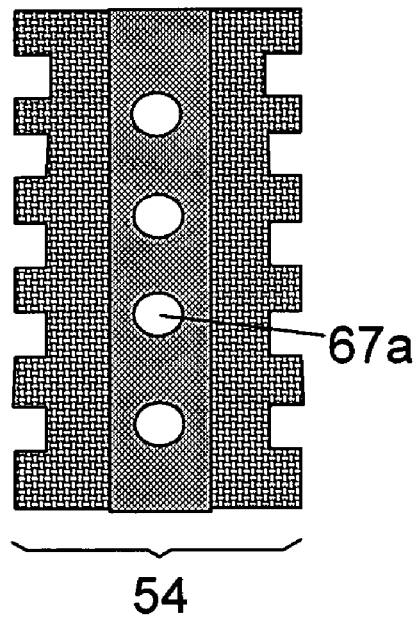
Figure 7:
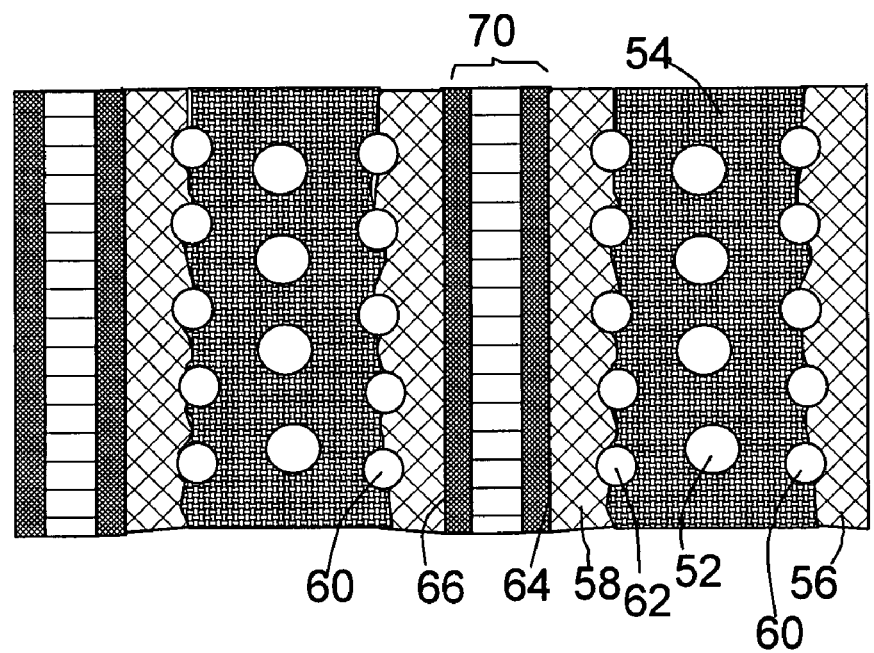
FIG. 7: A sectional view of stacked fuel cells using a series of bipolar plates in accordance with the present invention.

Preferably, coolant channels are built into a bipolar plate when it is molded. For instance, as schematically shown in FIG. 6(a), two uncured or partially cured bi-layer SMC plates (with the plastic film peeled off, leaving behind a resin mixture layer 63a or 63b and flexible graphite layer 65a or 65b) may be molded between a pair of matched molds (61a, 61b) and a number of molding pins 67. These pins, coated with a mold release agent, may be pulled out of the SMC structure to obtain an integral bipolar plate 54 (FIG. 6(b)) with built-in coolant channels 67a. Optionally, coolant channels may be fitted with connectors, preferably before the resin matrix material is solidified. FIG. 7 shows back-to-back flow field plates that are fabricated as one monolithic component 54, with coolant channels 52 formed as complete channels within the component, as well as reactant channels 60 & 62. The two outer surfaces of bipolar plate 54 are stacked against respective diffuser layers 56,58 (preferably made of carbon paper), which are in turn connected to catalyst-coated membrane (e.g., 70).

The present invention provides the fuel cell industry with a highly conductive flow field plate or bipolar plate component. The resulting fuel cell system is of lower costs (due to their amenability to mass production) and better performance (due to lower contact resistance and internal resistance and, hence, higher voltage and power output). In addition, the flexible graphite layers (without ceramic fibers punching through them) provide good corrosion resistance and high resistance to permeation by oxygen or hydrogen in a fuel cell.

Conductivity measurements can be made by using the four-point probe method on small-sized plate samples. Table 1 summarizes the parameters and properties of several samples prepared in the present study.

TABLE 1

Properties of FG-based multi-layer bipolar plates.

| Sample No. | Filler and resin proportions (Weight %) | No. of layers | Final plate thickness (mm) | In-plane conductivity (S/cm) | Thickness-dir. conductivity (S/cm) | Areal conduc. (S/cm2) |
|---|---|---|---|---|---|---|
| 1 | 55% Ep, 25% Ag, 20% NGP | 3 | 0.35 | 250 | 25 | 714.3 |
| 2 | 55% Ep, 25% Ag, 20% NGP | 5 | 0.58 | 230 | 21 | 362.1 |

TABLE 1-continued

Properties of FG-based multi-layer bipolar plates.

| Sample No. | Filler and resin proportions (Weight %) | No. of layers | Final plate thickness (mm) | In-plane conductivity (S/cm) | Thickness-dir. conductivity (S/cm) | Areal conduc. (S/cm2) |
|---|---|---|---|---|---|---|
| 3 | 30% Ep, 35% GP, 35% GNF | 3 | 0.45 | 350 | 45 | 1000 |
| 4 | 50% Ep, 35% GP, 15% GNF | 3 | 0.44 | 230 | 27 | 613.6 |
| 5 | 70% Ep, 20% GP, 10% NGP | 3 | 0.42 | 135 | 14 | 333.3 |
| 6 | 30% Ep, 70% GP | 5 | 0.62 | 420 | 47 | 758.1 |
| 7 | 50% Ep, 30% GP, 20% CF | 5 | 0.63 | 210 | 23 | 365.1 |
| 8 | 70% Ep, 29% GP, 1% CNT | 5 | 0.58 | 128 | 12 | 206.9 |
| 9 | 85% Ep, 15% GP | 3 | 0.38 | 65 | 8 | 210.5 |
| 10 | 35% Ep, 35% GP, 30% NGP | 7 | 0.83 | 312 | 37 | 445.8 |
| 11 | 35% Ep, 40% GP, 25% GF | 7 | 0.86 | 180 | 18 | 209.3 |
| 12 | 35% Ep, 40% GP, 25% NGP | 2 | 0.23 | 332 | 28 | 1217.4 |
| 13 | 25% Ep, 50% GP, 25% NGP | 3 | 0.44 | 435 | 35 | 795.4 |
| 14 | 50% Ep, 20% CB, 30% NGP | 3 | 0.43 | 135 | 12 | 279.1 |
| 15 | 50% VE, 20% CB, 30% NGP | 3 | 0.45 | 125 | 12 | 266.7 |
| 16 | 55% VE, 50% GNF | 5 | 0.63 | 195 | 21 | 333.3 |

Note:
Ep = epoxy,
VE = vinyl ester resin,
GP = fine graphite particles,
NGP = nano graphene plate,
CB = carbon black,
CF = carbon fiber,
GF = glass fiber,
GNF = graphitic nano fiber
Ag = silver particles,
CNT = carbon nanotube The results show that the filler-resin mixture composition has a profound influence on the conductivity of the resulting multilayer bipolar plate. The plates molded from most of the precursor compositions exhibit very impressive electronic conductivity. These superior conductivity values, achieved with relatively inexpensive materials, are far superior to those of most of the prior art bipolar plates.

In summary, the presently invented precursor composite composition has the following features and advantages:

(1) This precursor composition can be manufactured by using a fast and cost-effective roll-to-roll process. The process can be automated and adaptable for mass production. The starting materials are relatively inexpensive graphite-based materials. No expensive and tedious process such as chemical vapor infiltration is required. The resulting bipolar plate or flow field plate is of low cost.
(2) The resulting bipolar plate or flow field plate is of excellent structural integrity and is not subject to the delamination problem commonly associated with other multi-layer composites induced by the mis-match in coefficients of thermal expansion and elastic constants between layers.
(3) Flexible graphite layers are highly resistant to permeation by hydrogen and oxygen gases. No rigid ceramic or glass fibers are used to punch through flexible graphite layers (as in a prior art technology) and, hence, the bipolar plate obtained from the presently invented composition maintains a high permeation resistance.
(4) The bipolar plate obtained from the presently invented composition exhibits excellent electrical conductivity that exceeds the target bipolar plate conductivity value set forth by the US Department of Energy for automotive fuel cell applications.
(5) The precursor composition may be made into a coiled form for easy storing, shipping, and handling operations. If stored in a refrigerator, the resin curing reaction will not advance to any significant extent and, hence, the composition can have a long storage life. The end-user can simply un-coil the composition, cut, and mold the material into bipolar plates. Alternatively, the molding or embossing process can be a continuation of the precursor composition manufacturing process. Mass manufacturability is essential to lowering the cost of bipolar plates.

What is claimed is:

1. A moldable, multiple-layer precursor composition to an electrically conductive composite flow field plate or bipolar plate, said composition comprising at least a first conductive sheet, a second conductive sheet, and a first conductive filler-resin mixture layer disposed between said first conductive sheet and said second conductive sheet, wherein
   (a) at least one of said first conductive sheet and second conductive sheet comprises a flexible graphite sheet; and
   (b) said conductive filler is present in a sufficient quantity to render said composition, after being molded into a plate, electrically conductive with a conductivity normal to said flexible graphite sheet no less than 10 S/cm or a conductivity parallel to said flexible graphite sheet no less than 100 S/cm.

2. The precursor composition as defined in claim 1 wherein each of the first conductive sheet and the second conductive sheet comprises a flexible graphite sheet.

3. The precursor composition as defined in claim 1 further comprising a third conductive sheet and a second conductive filler-resin mixture layer to form a five-layer laminate precursor, wherein these five layers are overlaid to one another in the following sequence: the first conductive sheet, the first mixture layer, the second conductive sheet, the second mixture layer, and the third conductive sheet.

4. The precursor composition as defined in claim 3 wherein at least two of the three conductive sheets comprise a flexible graphite sheet.

5. The precursor composition as defined in claim 3 wherein each of the three conductive sheets comprises a flexible graphite sheet.

6. The precursor composition as defined in claim 1 wherein one of the conductive sheets comprises a carbon paper, carbon or graphite fabric, conductive polymer film, or metal foil.

7. The precursor composition as defined in claim 3 wherein at least one but no more than two of the three conductive sheets comprise a carbon paper, carbon or graphite fabric, conductive polymer film, or metal foil.

8. The precursor composition as defined in claim 3 further comprising a third conductive filler-resin mixture layer and a fourth conductive sheet wherein said third mixture layer is attached to the third conductive sheet and said fourth conductive sheet is attached to said third mixture layer to form a seven-layer precursor laminate.

9. The precursor composition as defined in claim 8 wherein at least two of the four conductive sheets comprise a flexible graphite sheet.

10. The precursor composition as defined in claim 8 wherein each of the four conductive sheets comprises a flexible graphite sheet.

11. The precursor composition as defined in claim 8 wherein at least one but no more than three of the conductive sheets comprises a carbon paper, carbon or graphite fabric, conductive polymer film, or metal foil.

12. The precursor composition as defined in claim 1 wherein said resin is selected from the group consisting of unsaturated polyester resin, vinyl ester resin, epoxy resin, phenolic resin, polyimide resin, bismaleimide resin, polyurethane resin, thermoplastic resin, and combinations thereof.

13. The precursor composition as defined in claim 3 wherein said resin is selected from the group consisting of unsaturated polyester resin, vinyl ester, epoxy resin, phenolic resin, polyimide resin, bismaleimide resin, polyurethane resin, thermoplastic resin, and combinations thereof.

14. The precursor composition as defined in claim 1 wherein said conductive filler comprises a conductive material selected from the group consisting of carbon fibers, metal fibers, carbon nano-tubes, graphitic nano-fibers, nano-scaled graphene plates, carbon blacks, metal particles, and combinations thereof.

15. The precursor composition as defined in claim 3 wherein said conductive filler comprises a conductive material selected from the group consisting of carbon fibers, metal fibers, carbon nano-tubes, graphitic nano-fibers, nano-scaled graphene plates, carbon blacks, metal particles, and combinations thereof.

16. The precursor composition as defined in claim 1 wherein said resin comprises a polymerizable, curable, or cross-linkable resin with a catalyst, an accelerator, or a curing agent contained therein.

17. The precursor composition as defined in claim 1 wherein said composition, after molding to form a flow field plate or bipolar plate, has an electrical conductivity parallel to said flexible graphite sheet no less than 200 S/cm.

18. The precursor composition as defined in claim 1 wherein said composition, after molding to form a flow field plate or bipolar plate, has an areal electrical conductivity no less than 200 S/cm$^2$.

19. The precursor composition as defined in claim 3 wherein said composition, after molding to form a flow field plate or bipolar plate, has an electrical conductivity parallel to said flexible graphite sheet no less than 200 S/cm or an areal electrical conductivity no less than 200 S/cm$^2$.

20. The precursor composition as defined in claim 8 wherein said composition, after molding to form a flow field plate or bipolar plate, has an electrical conductivity no less than 100 S/cm.

21. The precursor composition as defined in claim 1, wherein said first mixture layer is approximately 40 μm or thinner.

22. The precursor composition as defined in claim 3 wherein said first mixture layer or second mixture layer is approximately 40 μm or thinner.

23. A moldable, multiple-layer precursor composition to an electrically conductive composite flow field plate or bipolar plate, said composition comprising a plurality of conductive sheets and a plurality of conductive filler-resin mixture layers wherein
  (A) each conductive sheet is attached to at least one filler-resin mixture layer;
  (B) at least one of said conductive sheets comprises flexible graphite; and
  (C) at least one filler-resin mixture layer comprises a thermosetting resin and conductive fillers with the fillers being present in a sufficient quantity to render said flow field plate or bipolar plate, after molding, electrically conductive with an electrical conductivity no less than 100 S/cm or an areal electrical conductivity no less than 200 S/cm$^2$.

24. The multiple-layer precursor composition as defined in claim 23 wherein said composition has two opposing outer sheets, which are a top sheet and a bottom sheet, each comprising flexible graphite.

25. The multiple-layer precursor composition as defined in claim 23 wherein a conductivity of said molded plate is greater than 200 S/cm.

26. The multiple-layer precursor composition as defined in claim 23, wherein said conductive fillers comprise a conductive material selected from the group consisting of carbon fibers, metal fibers, carbon nano-tubes, graphitic nano-fibers, nano-scaled graphene plates, carbon blacks, metal particles, and combinations thereof.

27. A moldable, bi-layer precursor composition to an electrically conductive composite flow field plate or bipolar plate, said composition comprising a first flexible graphite sheet and a first conductive filler-resin mixture layer overlaying said first conductive sheet, wherein said conductive filler is present in a sufficient quantity to render said composition, after being molded into a plate, electrically conductive with a conductivity normal to said flexible graphite sheet no less than 10 S/cm or a conductivity parallel to said flexible graphite sheet no less than 100 S/cm.

28. The precursor composition as defined in claim 27, further comprising a non-sticking protective layer overlaying said first conductive filler-resin layer.

29. The precursor composition as defined in claim 3, wherein a resin in a filler-resin mixture is cured or solidified to form a fuel cell bipolar plate or flow field plate comprising a flow field channel on at least a surface of said plate.

30. The precursor composition as defined in claim 8, wherein a resin in a filler-resin mixture is cured or solidified to form a fuel cell bipolar plate or flow field plate comprising a flow field channel on at least a surface of said plate.

* * * * *